(12) United States Patent
Zhu et al.

(10) Patent No.: US 10,574,970 B2
(45) Date of Patent: Feb. 25, 2020

(54) APPARATUS AND METHOD FOR FOCAL LENGTH ADJUSTMENT AND DEPTH MAP DETERMINATION

(71) Applicant: SZ DJI TECHNOLOGY CO., LTD., Shenzhen (CN)

(72) Inventors: Zhenyu Zhu, Shenzhen (CN); Cong Zhao, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 131 days.

(21) Appl. No.: 15/701,041

(22) Filed: Sep. 11, 2017

(65) Prior Publication Data

US 2017/0374354 A1 Dec. 28, 2017

Related U.S. Application Data

(63) Continuation of application No. PCT/CN2015/074336, filed on Mar. 16, 2015.

(51) Int. Cl.
H04N 13/246 (2018.01)
H04N 13/239 (2018.01)
H04N 13/106 (2018.01)
H04N 13/271 (2018.01)
H04N 13/296 (2018.01)
H04N 13/00 (2018.01)
(Continued)

(52) U.S. Cl.
CPC ......... *H04N 13/246* (2018.05); *H04N 13/106* (2018.05); *H04N 13/239* (2018.05); *H04N 13/271* (2018.05); *H04N 13/296* (2018.05); *B64C 39/024* (2013.01); *B64C 2201/127* (2013.01); *B64D 47/08* (2013.01); *H04N 2013/0081* (2013.01)

(58) Field of Classification Search
None
See application file for complete search history.

(56) References Cited

U.S. PATENT DOCUMENTS 6,148,270 A 11/2000 Nakajima et al.
6,701,081 B1 3/2004 Dwyer et al.
8,514,291 B2 8/2013 Chang
(Continued)

FOREIGN PATENT DOCUMENTS

CN 101243458 A 8/2008
CN 101840146 A 9/2010
(Continued)

OTHER PUBLICATIONS

The World Intellectual Property Organization (WIPO) International Search Report and Written Opinion for PCT/CN2015/074336 dated Dec. 21, 2015 7 Pages.
(Continued)

*Primary Examiner* — Pankaj Kumar
*Assistant Examiner* — Charles N Hicks
(74) *Attorney, Agent, or Firm* — Anova Law Group, PLLC

(57) ABSTRACT

A method for focal length adjustment includes capturing scene images of a scene using a first imaging device and a second imaging device of an imaging mechanism, determining a distance between an object of interest in the scene and the imaging mechanism based on the scene images of the scene, and automatically adjusting a focal length of the imaging mechanism according to the distance.

19 Claims, 9 Drawing Sheets

(51) Int. Cl.
*B64C 39/02* (2006.01)
*B64D 47/08* (2006.01)

(56) References Cited

U.S. PATENT DOCUMENTS

| | | | |
|---|---|---|---|
| 9,307,222 B1* | 4/2016 | Tang | H04N 5/23222 |
| 9,571,819 B1* | 2/2017 | Barron | H04N 13/128 |
| 9,704,250 B1* | 7/2017 | Shah | G06T 7/0065 |
| 2012/0154546 A1 | 6/2012 | Ban et al. | |
| 2012/0236125 A1 | 9/2012 | Umezawa et al. | |
| 2012/0327195 A1 | 12/2012 | Cheng | |
| 2013/0208093 A1 | 8/2013 | Sun et al. | |
| 2013/0235163 A1 | 9/2013 | Joo | |
| 2014/0307054 A1 | 10/2014 | Chang et al. | |
| 2014/0347456 A1 | 11/2014 | Kato et al. | |
| 2015/0010236 A1 | 1/2015 | Chang et al. | |
| 2016/0117829 A1* | 4/2016 | Yoon | G06T 7/50 348/222.1 |

FOREIGN PATENT DOCUMENTS

| | | |
|---|---|---|
| CN | 201803697 U | 4/2011 |
| CN | 102591532 A | 7/2012 |
| CN | 102592117 A | 7/2012 |
| CN | 102609936 A | 7/2012 |
| CN | 102779274 A | 11/2012 |
| CN | 103350281 A | 10/2013 |
| CN | 103595916 A | 2/2014 |
| EP | 2293588 A1 | 3/2011 |
| EP | 2336027 A1 | 6/2011 |
| TW | 201439659 A | 10/2014 |
| WO | 2007050776 A2 | 5/2007 |

OTHER PUBLICATIONS

The European Patent Office (EPO) The Extended European Search Report for 15874398.9 dated Oct. 25, 2016 12 Pages.

Stan Birchfield and Carlo Tomasi, Depth Discontinuities by Pixel-to-Pixel Stereo, International Journal of Computer Vision, 1999, pp. 269-293, vol. 35, No. 3, Kluwer Academic Publishers.

Stan Birchfield and Carlo Tomasi, A Pixel Dissimilarity Measure That Is Insensitive to Image Sampling, IEEE Transactions on Pattern Analysis and Machine Intelligence, Apr. 1998, pp. 401-406, vol. 20, No. 4.

Yan Gao et al., "Active Zoom Cameras Control System using Stereo Parallax", Security Technology (ICCST), 2010 IEEE International Carnahan Conference on, IEEE, Piscataway, NJ, USA, Oct. 5, 2010 (Oct. 5, 2010), pp. 418-424.

Yan Gao et al., "Zoom Control of Wide Area Tracking System", Intelligent Systems (IS), 2010 5th IEEE International Conference, IEEE, Piscataway, NJ, USA, Jul. 7, 2010 (Jul. 7, 2010), pp. 402-407.

* cited by examiner

APPARATUS AND METHOD FOR FOCAL LENGTH ADJUSTMENT AND DEPTH MAP DETERMINATION

CROSS-REFERENCE TO RELATED APPLICATION

This is a continuation application of International Application No. PCT/CN2015/074336, filed on Mar. 16, 2015, the entire contents of which are incorporated herein by reference.

FIELD

The disclosed embodiments relate generally to digital imaging and more particularly, but not exclusively, to apparatus and methods for adjusting a focal length automatically and/or determining a depth map for an image.

BACKGROUND

Stereoscopic imaging, a technique whereby multiple imaging devices are used to form a three dimensional image through stereopsis, is becoming increasingly common in many fields. Stereoscopic imaging is particularly useful in robotics, where it is often desirable to gather three-dimensional information about an operating environment of a machine. Stereoscopic imaging simulates the binocular visions of human eyes and applies the principle of stereopsis to achieve depth perception. This technique can be reproduced by artificial imaging devices by viewing a given object of interest using multiple imaging devices from slightly different vantage points. Differences between varying views of the object of interest convey depth information about a position of the object, thereby enabling three-dimensional imaging of the object.

During the shooting of videos or television plays, tracking focal length is a difficult and professional task. Main current focal length tracking devices require experienced focal length tracking operators to adjust focal length of the cameras based on the monitor screens and the shooting site situations in real time.

For certain imaging applications, manual focal length adjustment is cumbersome and may be impractical where the imaging device is operated remotely. Accordingly, it is desirable that a focal length adjustment system be able to automatically adjust the focal length to track a moving object of interest.

SUMMARY

In accordance with a first aspect disclosed herein, there is set forth a method for automatic focal length adjustment, comprising:
  determining a distance between an object of interest and an imaging mechanism; and
  automatically adjusting a focal length of the imaging mechanism according to the determining the distance.

In an exemplary embodiment of the disclosed methods, the determining comprises determining the distance between the object of interest in a scene and the imaging mechanism.

In an exemplary embodiment of the disclosed methods, the determining comprises imaging the scene with first and second imaging devices contained in the imaging mechanism.

In an exemplary embodiment of the disclosed methods, the determining further comprises:
  obtaining a depth map of the scene;
  selecting the object of interest in the scene; and
  calculating the distance of the object of interest according to the depth map of the scene.

In an exemplary embodiment of the disclosed methods, the obtaining comprises calculating a disparity of scene images from the first and second imaging devices.

In an exemplary embodiment of the disclosed methods, the calculating the disparity comprises optimizing a global energy function.

In an exemplary embodiment of the disclosed methods, the optimizing the global energy function comprises summing a disparity energy function and a scaled smoothing term.

In an exemplary embodiment of the disclosed methods, the disparity energy function is represented by a Birchfield-Tomasi term.

In an exemplary embodiment of the disclosed methods, the Birchfield-Tomasi term is defined by accumulating the minimum disparity of coordinates for pixels in a first image of the scene captured by the first imaging device and a second image of the scene captured by the second imaging device.

An exemplary embodiment of the disclosed methods further comprises, for all neighbors of a pixel, accumulating scaled trigger functions of a disparity between two neighboring pixels to obtain the smoothing term.

In an exemplary embodiment of the disclosed methods, the accumulating comprises, for all neighbors of a pixel, accumulating scaled trigger functions of a disparity between two neighboring pixels from four domains.

In an exemplary embodiment of the disclosed methods, the smoothing term is obtained by accumulating scaled trigger functions of disparity for all neighbors of each pixel.

An exemplary embodiment of the disclosed methods further comprises:
  aggregating data items in a plurality of directions to obtain an energy function for each of the directions; and
  accumulating the energy functions in the directions to obtain the energy function.

In an exemplary embodiment of the disclosed methods, the aggregating comprises obtaining energy functions in a predetermined number of directions.

In an exemplary embodiment of the disclosed methods, the aggregating comprises obtaining energy functions in four or eight directions.

In an exemplary embodiment of the disclosed methods, the aggregating data items comprises obtaining energy function in a direction by summing a corresponding smoothing item and a dynamic planning in the direction.

In an exemplary embodiment of the disclosed methods, the summing the corresponding smoothing item and the dynamic planning in the direction comprises presenting the dynamic planning in the direction with a recurrence based on the energy functions of its neighbors in this direction.

In an exemplary embodiment of the disclosed methods, the direction comprises a horizontal direction.

In an exemplary embodiment of the disclosed methods, the aggregating data items in the horizontal direction comprises calculating the energy by a recurrence based on the energy functions of its neighbors in the horizontal direction.

An exemplary embodiment of the disclosed methods further comprises obtaining the best depth.

In an exemplary embodiment of the disclosed methods, the obtaining the best depth comprises seeking the disparity value that minimizes the summation of energy in a plurality of directions.

In an exemplary embodiment of the disclosed methods, the obtaining the best depth comprises seeking the disparity value based on an energy function in one direction.

An exemplary embodiment of the disclosed methods further comprises reducing noise by doing at least one of matching scene images from the first and second imaging devices and identifying respective unique features of the scene images while setting the disparity as −1.

An exemplary embodiment of the disclosed methods further comprises compensating an error based on the factors at least selected from a group consisting of the distance between a central line of the two imaging devices, an actual distance of two adjacent pixels, the focal length of the two imaging devices and the depth between the object of interest and the first and second imaging devices.

An exemplary embodiment of the disclosed methods further comprises optimizing the depth map by using a non-partial optimizing equation.

An exemplary embodiment of the disclosed methods further comprises obtaining a Jacobi iteration of the non-partial optimizing equation by using a recurrence filtering.

In an exemplary embodiment of the disclosed methods, the selecting the object of interest in the scene comprises receiving outside instructions to select the object of interest.

In an exemplary embodiment of the disclosed methods, the receiving the instructions comprises identifying the object of interest selected on either of scene images from the first or the second imaging device.

In an exemplary embodiment of the disclosed methods, the identifying the object of interest selected comprises sensing a frame on either of the scene images framing in the object of interest or sensing a click on the object of interest on either of the scene images.

In an exemplary embodiment of the disclosed methods, the receiving the outside instructions comprises receiving vocal instructions, optionally a pre-set name of the object of interest, to determine the object of interest.

In an exemplary embodiment of the disclosed methods, the selecting the object of interest in the scene comprises judging under at least one pre-set rule and automatically determining the object of interest based on the judging.

In an exemplary embodiment of the disclosed methods, the judging under the at least one pre-set rule comprises judging if the object is approaching or within a certain distance of the imaging mechanism.

In an exemplary embodiment of the disclosed methods, the automatically adjusting the focus comprises automatically adjusting the focal length of the imaging mechanism in real time with tracking learning detection based on gray level information of the object of interest.

In accordance with another aspect disclosed herein, there is set forth a stereoscopic imaging system configured to perform automatic focal length adjustment in accordance with any one of the above methods.

In accordance with another aspect disclosed herein, there is set forth a focal length adjustment apparatus, comprising:
  a distance assembly for determining a distance between an object of interest in a scene and an imaging mechanism for imaging the scene; and
  a focal length assembly for automatically adjusting a focal length of the imaging mechanism according to the determined distance.

In an exemplary embodiment of the disclosed apparatus, the distance assembly is configured to determine the distance between the object of interest in a scene and the imaging mechanism.

In an exemplary embodiment of the disclosed apparatus, the imaging mechanism comprises first and second imaging devices imaging the scene to obtain first and second scene images.

In an exemplary embodiment of the disclosed apparatus, either of the first and second imaging devices is a camera or a sensor.

In an exemplary embodiment of the disclosed apparatus, the first and second imaging devices are selected from a group consisting of laser cameras, infrared cameras, ultrasound cameras and Time-of-Flight cameras.

In an exemplary embodiment of the disclosed apparatus, the first and second imaging devices are Red-Green-Blue (RGB) cameras.

In an exemplary embodiment of the disclosed apparatus, the distance assembly comprises:
  a depth estimation mechanism for obtaining a depth map of the scene;
  an object determination mechanism for determining the object of interest in the scene; and
  a calculating mechanism for calculating distance of the object of interest according to the depth map of the scene.

In an exemplary embodiment of the disclosed apparatus, the depth map is obtained based on a disparity of the first and the second scene images.

In an exemplary embodiment of the disclosed apparatus, the depth estimation mechanism optimizes a global energy function.

In an exemplary embodiment of the disclosed apparatus, the global energy function is defined as a sum of a disparity energy function and a scaled smoothing term.

In an exemplary embodiment of the disclosed apparatus, the disparity energy function comprises a Birchfield-Tomasi data term.

In an exemplary embodiment of the disclosed apparatus, the Birchfield-Tomasi data term is defined based on the minimum disparity of coordinates for pixels in a first image of the scene captured by the first imaging device and a second image of the scene captured by the second imaging device.

In an exemplary embodiment of the disclosed apparatus, the smoothing term adopts an energy function of differential of disparity.

In an exemplary embodiment of the disclosed apparatus, the smoothing term is, for all neighbors of a pixel with the coordination of (x,y), a summation of scaled trigger function of a disparity between two neighboring pixels.

In an exemplary embodiment of the disclosed apparatus, the neighbors are pixels from four domains.

In an exemplary embodiment of the disclosed apparatus, the smoothing term is defined based on scaled trigger functions of a disparity for all neighbors of each pixel.

In an exemplary embodiment of the disclosed apparatus, the global energy function is optimized by
  aggregating data terms in a plurality of directions to obtain a directional energy function for each of the directions; and
  accumulating the directional energy functions in the directions to obtain the energy function.

In an exemplary embodiment of the disclosed apparatus, the directions comprise a predetermined number of directions.

In an exemplary embodiment of the disclosed apparatus, the predetermined number of directions comprise four or eight directions.

In an exemplary embodiment of the disclosed apparatus, the energy function in one direction is based on a dynamic planning in the direction.

In an exemplary embodiment of the disclosed apparatus, the energy function in one direction is obtained by summing a corresponding smoothing term and the dynamic planning in this direction.

In an exemplary embodiment of the disclosed apparatus, the dynamic planning in the direction is a recurrence based on the energy functions of its neighbors in this direction.

In an exemplary embodiment of the disclosed apparatus, the direction comprises a horizontal direction.

In an exemplary embodiment of the disclosed apparatus, the energy function in horizontal direction is obtained by a recurrence based on the energy functions of its neighbors the horizontal direction.

In an exemplary embodiment of the disclosed apparatus, the best depth is obtained by seeking the disparity value that minimizes the summation of energy in a plurality of directions.

In an exemplary embodiment of the disclosed apparatus, the best depth is obtained based on an energy function in one direction.

In an exemplary embodiment of the disclosed apparatus, noise is reduced by matching the first and second scene images and/or identifying respective unique features of the first and second scene images while setting the disparity as −1.

In an exemplary embodiment of the disclosed apparatus, an error is compensated based on the factors at least selected from a group consisting of the distance between the central lines of the two imaging devices, actual distance of two adjacent pixels, the focal length of the two imaging devices and the depth between the object of interest and the first and second imaging devices.

In an exemplary embodiment of the disclosed apparatus, the depth map is optimized by using a non-partial optimizing equation.

An exemplary embodiment of the disclosed apparatus comprises obtaining a Jacobi iteration of the non-partial optimizing equation by a recurrence filtering.

In an exemplary embodiment of the disclosed apparatus, the object determination mechanism receives outside instructions to determine the object of interest.

In an exemplary embodiment of the disclosed apparatus, the object determination mechanism enables to identify the object of interest selected on either of the first and the second scene images.

In an exemplary embodiment of the disclosed apparatus, the object determination mechanism enables to identify the object of interest by at least one of sensing a frame on either of the first and the second scene images to frame in the object of interest and sensing a click on the object of interest on either of the first and the second scene images.

In an exemplary embodiment of the disclosed apparatus, the object determination mechanism receives outside vocal instructions, optionally a pre-set name of the object of interest, to determine the object of interest.

In an exemplary embodiment of the disclosed apparatus, the object determination mechanism automatically determines the object of interest based on a judgment under at least a pre-set rule.

In an exemplary embodiment of the disclosed apparatus, the pre-set rule comprises if the object of interest is approaching the first and the second imaging devices or within a certain distance.

In an exemplary embodiment of the disclosed apparatus, the focal length assembly automatically adjusts the focal length of the imaging mechanism in real time with tracking learning detection based on gray level information of the object of interest.

In accordance with another aspect disclosed herein, there is set forth a mobile platform performing in accordance with any one of the above methods.

In accordance with another aspect disclosed herein, there is set forth a mobile platform comprising any one of the above apparatus.

In accordance with another aspect disclosed herein, the above mobile platform is an unmanned aerial vehicle (UAV).

In accordance with another aspect disclosed herein, the above mobile platform is a self-stabilizing platform.

In accordance with another aspect disclosed herein, there is set forth a method for obtaining a depth map of a scene, comprising:
  capturing a plurality of scene images of the scene; and
  calculating a disparity of the plurality of scene images.

In an exemplary embodiment of the disclosed methods, the capturing the plurality of scene images comprises capturing the plurality of scene images via first and second imaging devices.

In an exemplary embodiment of the disclosed methods, the calculating the disparity comprises optimizing a global energy function.

In an exemplary embodiment of the disclosed methods, the optimizing the global energy function comprises summing a disparity energy function and a scaled smoothing term.

In an exemplary embodiment of the disclosed methods, the disparity energy function is represented by a Birchfield-Tomasi term.

In an exemplary embodiment of the disclosed methods, wherein the Birchfield-Tomasi term is defined by accumulating a minimum disparity of coordinates for pixels in a first image of the scene captured by the first imaging device and a second image of the scene captured by the second imaging device.

An exemplary embodiment of the disclosed methods further comprises, for all neighbors of a selected pixel, accumulating scaled trigger functions of a disparity between two neighboring pixels to the selected pixel to obtain the smoothing term.

In an exemplary embodiment of the disclosed methods, the accumulating comprises, for all neighbors of the selected pixel, accumulating scaled trigger functions of a disparity between two neighboring pixels from four domains.

In an exemplary embodiment of the disclosed methods, the smoothing term is obtained by accumulating scaled trigger functions of a disparity for all neighbors of each pixel.

An exemplary embodiment of the disclosed methods further comprises:
  aggregating data items in a plurality of directions to obtain a directional energy function for each of the directions; and
  accumulating the directional energy functions in the directions to obtain the energy function.

In an exemplary embodiment of the disclosed methods, the aggregating comprises obtaining energy functions in a predetermined number of directions.

In an exemplary embodiment of the disclosed methods, the aggregating comprises obtaining energy functions in four or eight directions.

In an exemplary embodiment of the disclosed methods, the aggregating data items comprises obtaining the energy function in a selected direction by summing a corresponding smoothing item and a dynamic planning in the selected direction.

In an exemplary embodiment of the disclosed methods, the summing the corresponding smoothing item and the dynamic planning in the direction comprises presenting the dynamic planning in the direction with a recurrence based on the energy functions of its neighbors in the direction.

In an exemplary embodiment of the disclosed methods, the direction comprises a horizontal direction.

In an exemplary embodiment of the disclosed methods, the aggregating data items in the horizontal direction comprises calculating the energy by a recurrence based on the energy functions of its neighbors in the horizontal direction.

An exemplary embodiment of the disclosed methods further comprises obtaining a best depth.

In an exemplary embodiment of the disclosed methods, the obtaining the best depth comprises seeking the disparity value that minimizes the summation of energy in a plurality of directions.

In an exemplary embodiment of the disclosed methods, the obtaining the best depth comprises seeking the disparity value based on an energy function in one direction.

An exemplary embodiment of the disclosed methods further comprises reducing noise by doing at least one of matching scene images from the first and second imaging devices and identifying respective unique features of the scene images while setting the disparity as −1.

An exemplary embodiment of the disclosed methods further comprises compensating an error based on factors at least selected from a group consisting of a distance between central lines of the two imaging devices, an actual distance of two adjacent pixels, a focal length of the two imaging devices and a depth between the object of interest and the first and second imaging devices.

An exemplary embodiment of the disclosed methods further comprises optimizing the depth map by using a non-partial optimizing equation.

An exemplary embodiment of the disclosed methods further comprises obtaining a Jacobi iteration of the non-partial optimizing equation by using a recurrence filtering.

In accordance with another aspect disclosed herein, there is set forth an apparatus for obtaining depth map of scene, comprising:
 an imaging system for capturing a plurality of scene images; and
 a depth assembly for calculating a disparity of the plurality of scene images.

In an exemplary embodiment of the disclosed apparatus, the imaging system comprises first and second imaging devices.

In an exemplary embodiment of the disclosed apparatus, the depth assembly is configured to optimize a global energy function.

In an exemplary embodiment of the disclosed apparatus, the global energy function is defined as a sum of a disparity energy function and a scaled smoothing term.

In an exemplary embodiment of the disclosed apparatus, the disparity energy function comprises a Birchfield-Tomasi data term.

In an exemplary embodiment of the disclosed apparatus, the Birchfield-Tomasi data term is defined based on a minimum disparity of coordinates for pixels in a first image of the scene captured by the first imaging device and a second image of the scene captured by the second imaging device.

In an exemplary embodiment of the disclosed apparatus, the smoothing term adopts an energy function of differential of disparity.

In an exemplary embodiment of the disclosed apparatus, the smoothing term is, for all neighbors of a selected pixel with the coordination of (x,y), a summation of scaled trigger functions of a disparity between two neighboring pixels.

In an exemplary embodiment of the disclosed apparatus, the neighbors are pixels from four domains.

In an exemplary embodiment of the disclosed apparatus, the smoothing term is defined based on scaled trigger functions of a disparity for all neighbors of each pixel.

In an exemplary embodiment of the disclosed apparatus, the global energy function is optimized by
 aggregating data terms in a plurality of directions to obtain an energy function for each of the directions; and
 accumulating the energy functions in the directions to obtain the energy function.

In an exemplary embodiment of the disclosed apparatus, the directions comprise a predetermined number of directions.

In an exemplary embodiment of the disclosed apparatus, the predetermined number of directions comprise four or eight directions.

In an exemplary embodiment of the disclosed apparatus, the energy function in one direction is based on a dynamic planning in the direction.

In an exemplary embodiment of the disclosed apparatus, the energy function in one direction is obtained by summing a corresponding smoothing term and the dynamic planning in the direction.

In an exemplary embodiment of the disclosed apparatus, the dynamic planning in the direction is a recurrence based on the energy functions of its neighbors in the direction.

In an exemplary embodiment of the disclosed apparatus, the direction comprises a horizontal direction.

In an exemplary embodiment of the disclosed apparatus, the energy function in horizontal direction is obtained by a recurrence based on the energy functions of its neighbors the horizontal direction.

In an exemplary embodiment of the disclosed apparatus, the depth assembly is configured to obtain a best depth by seeking the disparity value that minimizes the summation of energy in a plurality of directions.

In an exemplary embodiment of the disclosed apparatus, the best depth is obtained based on an energy function in one direction.

In an exemplary embodiment of the disclosed apparatus, the depth assembly is configured to reduce noise by matching the plurality of images and/or identifying respective unique features of the plurality of images while setting the disparity as −1.

In an exemplary embodiment of the disclosed apparatus, the depth assembly is configured to compensate an error based on factors at least selected from a group consisting of a distance between central lines of the two imaging devices, an actual distance of two adjacent pixels, a focal length of the two imaging devices and a depth between the object of interest and the first and second imaging devices.

In an exemplary embodiment of the disclosed apparatus, the depth map is optimized by using a non-partial optimizing equation.

In an exemplary embodiment of the disclosed apparatus, the depth assembly is configured to obtain a Jacobi iteration of the non-partial optimizing equation by a recurrence filtering.

Figure 1:
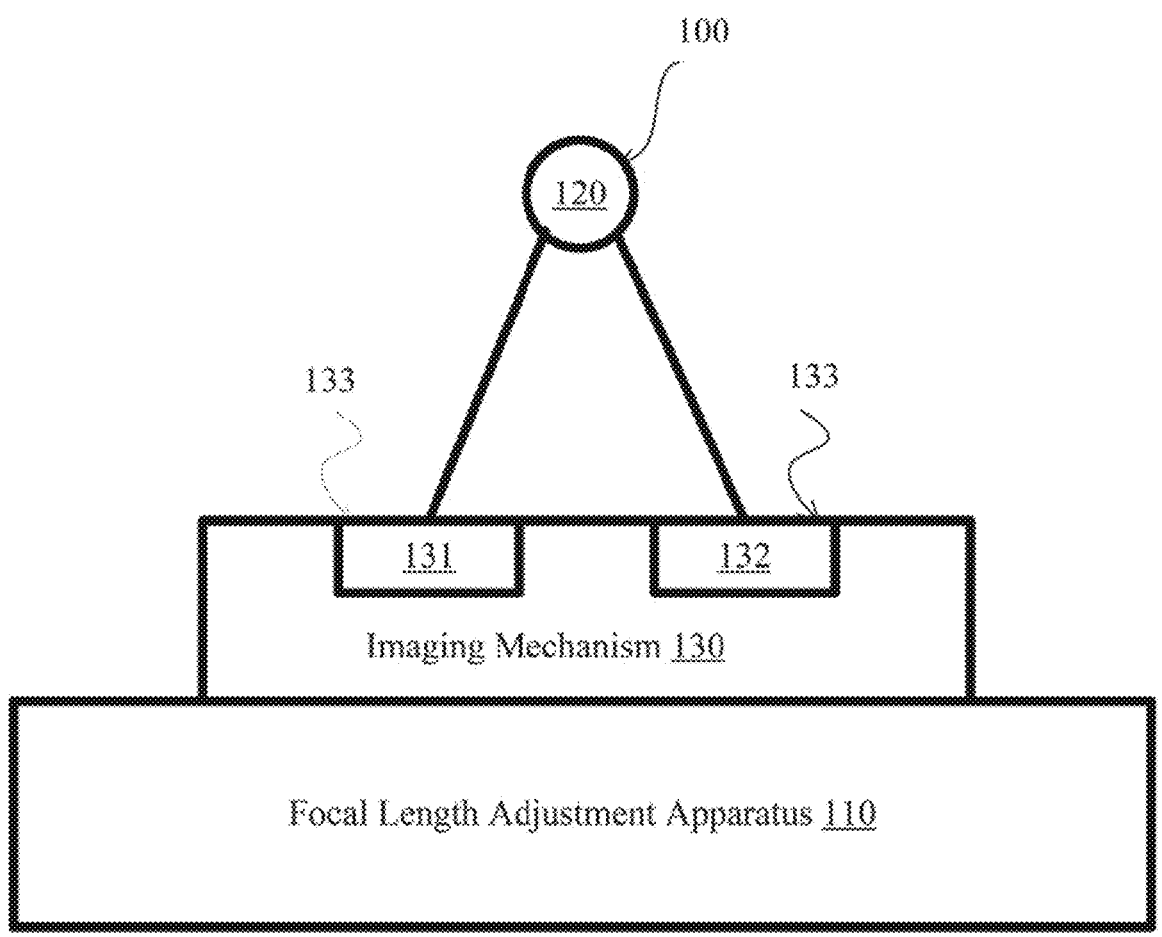
FIG. 1 is an exemplary top-level block diagram illustrating an embodiment of a focal length adjustment apparatus and an imaging mechanism with a first imaging device and a second imaging device.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available focal length adjustment systems are incapable of providing an automatic focal length adjustment for imaging systems, a focal length adjustment apparatus and method are provided for adjusting focal length automatically and serving as a basis for a wide range of applications, such as applications on unmanned aerial vehicles (UAVs) and other mobile platforms. This result can be achieved, according to one embodiment disclosed herein, by a focal length adjustment apparatus 110 as illustrated in FIG. 1.

FIG. 1 depicts an illustrative embodiment of a focal length adjustment apparatus 110. As shown in FIG. 1, the focal length adjustment apparatus 110 can be coupled with an imaging mechanism 130. The imaging mechanism 130 can generate one or more images of a scene 100 where an object 120 of interest is positioned.

Figure 2:
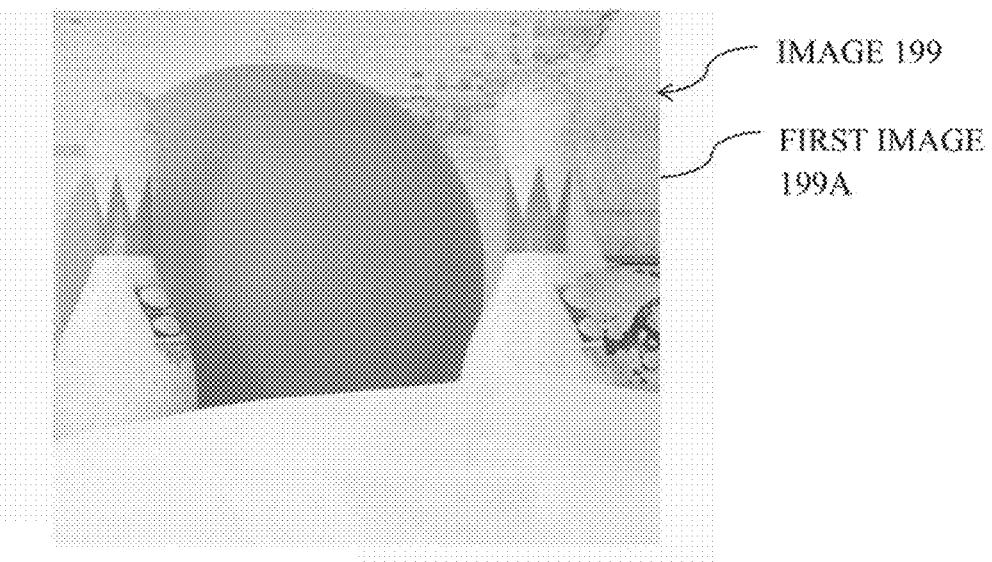
FIG. 2 and FIG. 3 show examples of two images of a scene obtained by the first imaging device and second imaging device of FIG. 1.
Figure 3:
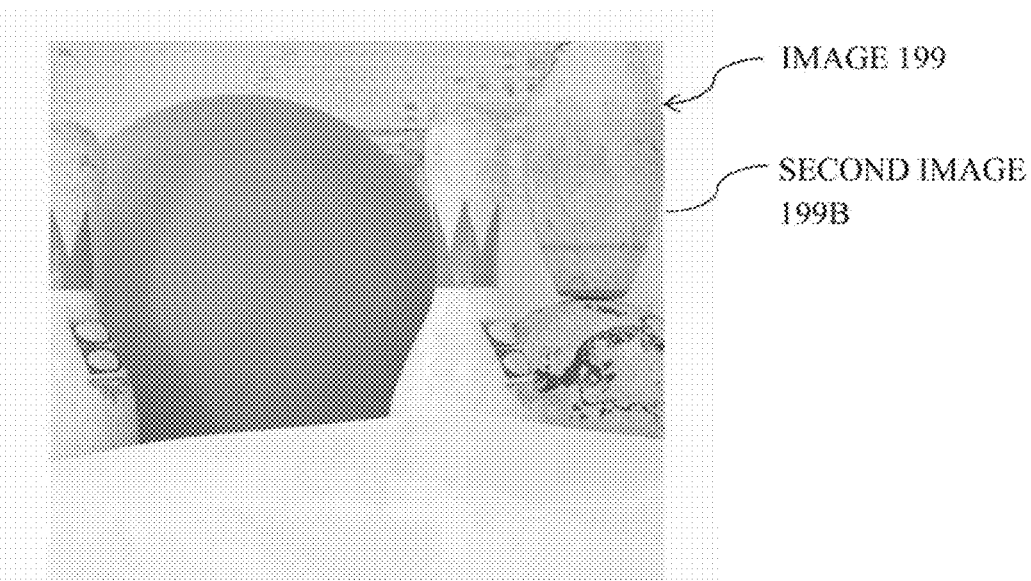

An example of images 199 of the scene 100 obtained by the imaging mechanism 130 are shown in FIG. 2 and FIG. 3. The generated images of the scene 100 can be processed by the focal length adjustment apparatus 110 to generate a signal for adjusting a focal length of the imaging mechanism 130. The focal length of the imaging mechanism 130 can be adjusted in any suitable manner. In some embodiments, the focal length of the imaging mechanism 130 can be adjusted in real time.

Although shown and described with reference to FIG. 1 as comprising two imaging devices 131, 132 for purposes of illustration only, the imaging mechanism 130 can comprise any suitable number of imaging devices 133. For example, the imaging mechanism 130 can have 2, 3, 4, 5, 6, or even a greater number of imaging devices. For an imaging mechanism 130 having more than two imaging devices, the automatic focal length adjustment illustrated herein can be applied as to any pair of the imaging devices.

The imaging devices 131, 132 of FIG. 1 can be arranged in any desired manner in the imaging mechanism 130. The specific arrangement of the imaging devices 131, 132 can depend on a relevant imaging application. In some embodiments, for example, the imaging devices 131, 132 can be positioned side-by-side so that the imaging devices 131, 132 have parallel optical axes. In other embodiments, the imaging devices 131, 132 can be positioned such that the optical axes of the imaging devices 131, 132 are not parallel.

Each of the imaging devices 131, 132 can sense light and convert the sensed light into electronic signals that can be ultimately rendered as an image. Exemplary imaging devices 131, 132 suitable for use with the focal length adjustment apparatus 110, include, but are not limited to, commercially-available cameras (color and/or monochrome) and camcorders. Suitable imaging devices 131, 132 can include analog imaging devices (for example, video camera tubes) and/or digital imaging devices (for example, charge-coupled device (CCD), complementary metal-oxide-semiconductor (CMOS), N-type metal-oxide-semiconductor (NMOS) imaging devices, and hybrids/variants thereof). Digital imaging devices, for example, can include a two-dimensional array of photosensor elements (not shown) that can each capture one pixel of image information. Either of the imaging devices 131, 132 can be, for example, an electro-optical sensor, a thermal/infrared sensor, a color or monochrome sensor, a multi-spectral imaging sensor, a spectrophotometer, a spectrometer, a thermometer, and/or a illuminometer. Furthermore, either of the imaging devices 131, 132 can be, for example, an Red-Green-Blue (RGB) camera, an ultrasonic camera, a laser camera, an infrared camera, an ultrasound camera or a Time-of-Flight camera. However, the imaging devices 131, 132 can be alternatively of the same type. Similarly, the focal lengths of the imaging devices 131, 132 can be the same and/or different without limitation to the scope of the present disclosure.

Figure 4:
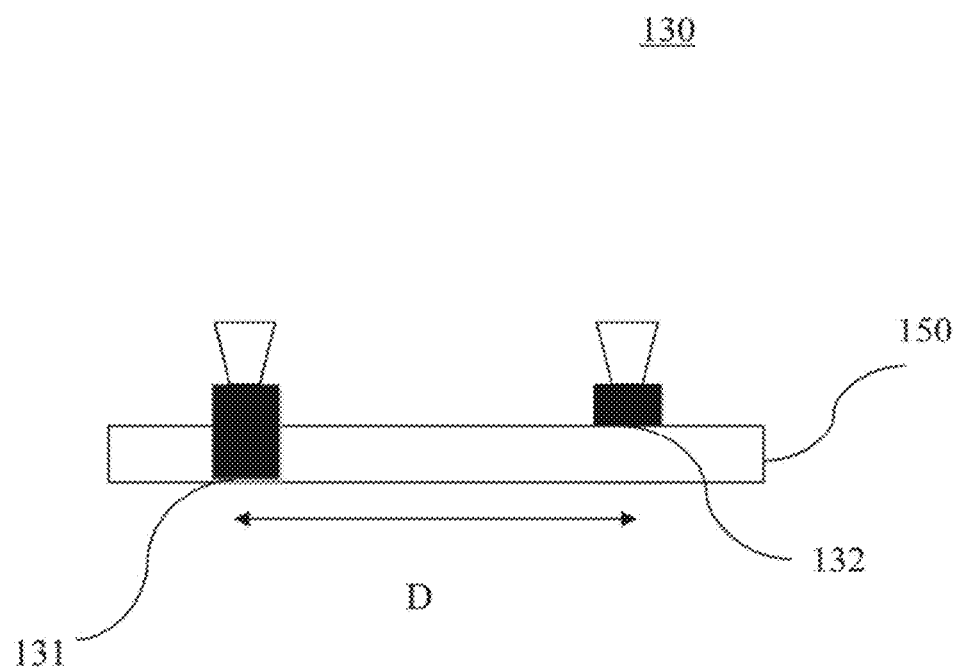
FIG. 4 is an exemplary block diagram showing an embodiment of the first imaging device and the second imaging device.

An exemplary first imaging device 131 and second imaging device 132 are shown in FIG. 4. A distance D between the first imaging device 131 and the second imaging device 132 can be adjustable depending on an object distance Z (shown in FIG. 6) between the imaging devices 131, 132 and the object 120 of interest. In an embodiment, the first imaging device 131 and the second imaging device 132 can be installed on a portable cradle head 150. Once the object 120 of interest is determined, the focal lengths of the first imaging device 131 and the second imaging device 132 can be adjusted automatically based on the object distance Z. By adjusting the focal lengths of the imaging devices 131, 132, the object 120 of interest can be made clearly visible.

In some embodiments, the focal length adjustment apparatus 110 (shown in FIG. 1) can be physically located adjacent to the imaging mechanism 130 (shown in FIG. 1), in which case data between the focal length adjustment apparatus 110 and the imaging mechanism 130 can be communicated locally. An advantage of local communication is that transmission delay can be reduced to facilitate real-time focal length adjustment, image processing, and parameter calibration. In other embodiments, the focal length adjustment apparatus 110 can be located remotely from the imaging mechanism 130. Remote processing may be adopted, for example, because of weight restrictions or other reasons relating to an operational environment of the focal length adjustment apparatus 110. As a non-limiting example, if the imaging mechanism 130 is mounted aboard a mobile platform, such as an unmanned aerial vehicle (UAV) (shown in FIG. 5), it may be desirable to convey imaging data to a remote terminal (not shown) for centralized processing, such as a ground terminal or base station. Centralized processing may be desirable, for example, where multiple UAVs are imaging a given object 120 of interest in a coordinated fashion. FIG. 4 illustrates an exemplary embodiment of the focal length adjustment apparatus 110, the imaging devices 131, 132 are installed on a UAV 400.

Figure 5:
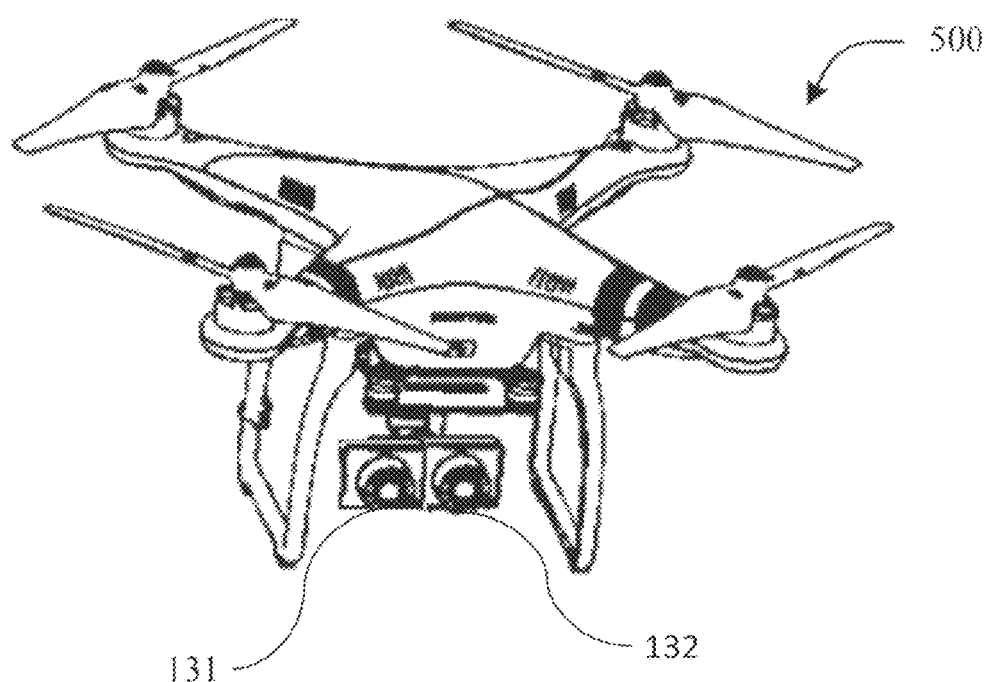
FIG. 5 is a detail drawing showing an alternative embodiment of the first imaging device and the second imaging device of FIG. 1, in which the first imaging device and the second imaging device are installed on an unmanned aerial vehicle (UAV).

Although shown and described as being the UAV 400 in FIG. 5 for exemplary purpose only, the mobile platform can be any kind of such platforms, including but not limited to any self-stabilizing mobile platforms.

Various communication methods can be used for remote communication between the imaging mechanism 130 and the focal length adjustment apparatus 110. Suitable communication methods include, for example, radio, Wireless Fidelity (Wi-Fi), cellular, satellite, and broadcasting. Exemplary wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

Alternatively and/or additionally, the imaging mechanism 130 can be at least partially incorporated into the focal length adjustment apparatus 110. The imaging mechanism 130 thereby can advantageously serve as a component of the focal length adjustment apparatus 110.

As shown in FIG. 1, the imaging mechanism 130 can interface with the focal length adjustment apparatus 110. For example, the imaging devices 131, 132 of the imaging mechanism 130 can acquire respective images 199 (shown in FIG. 2 and FIG. 3) of the scene 100 and relay the acquired images to the focal length adjustment apparatus 110 locally and/or remotely via a data communication system (not shown). The focal length adjustment apparatus 110 can be configured, for example, to reconstruct a three-dimensional depiction of the object 120 of interest using the two images via stereopsis. The focal length adjustment apparatus 110 thereby can determine whether a focal length adjustment would be advantageous based on the object distance Z between the imaging mechanism 130 and the object 120 of interest and/or to convey calibrating signals to the imaging mechanism 130 for a focal length adjustment. Additionally and/or alternatively, the focal length adjustment apparatus 110 can be advantageously configured to automatically calibrate one or more extrinsic parameters for stereoscopic imaging.

Figure 6:
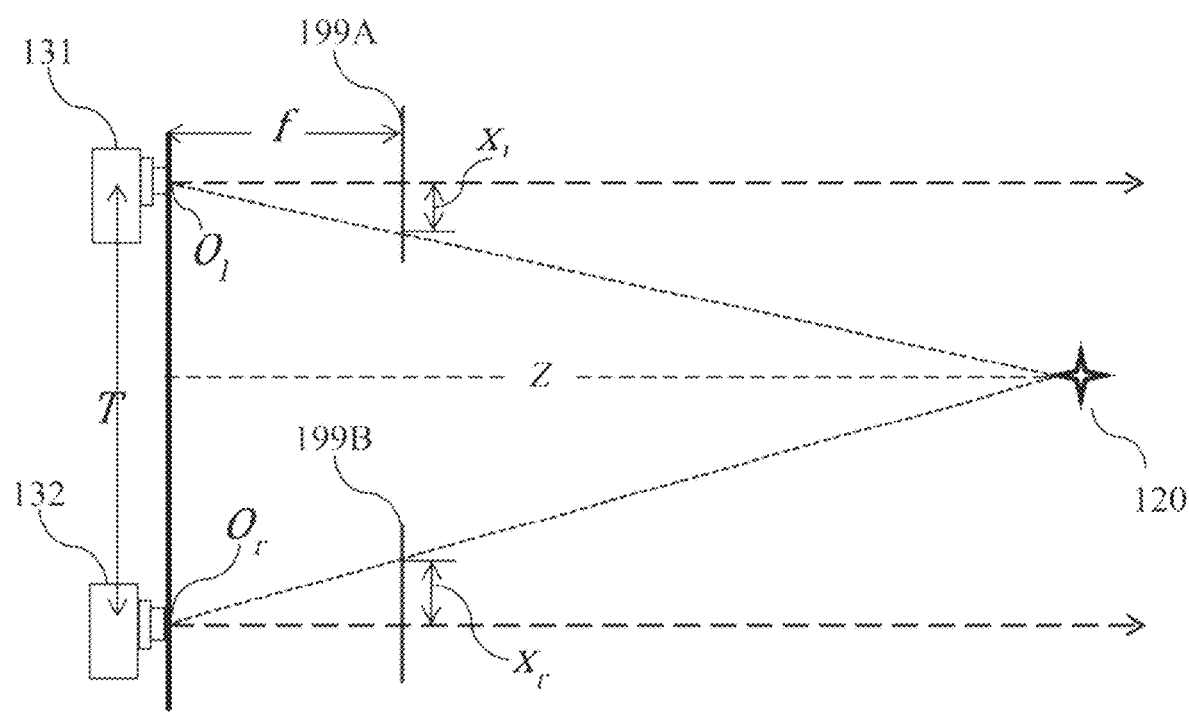
FIG. 6 schematically illustrates the process of computing a distance between an object of interest and the first and the second imaging devices of FIG. 1 via triangulation.

Referring now to FIG. 6, the images 199 acquired by the imaging devices 131, 132 can include images 199A and 199B. The images 199A (left, indicated as l in the following equations) and 199B (right, indicated as r in the following equations) can be compared to ascertain the object distance Z between the imaging devices 131, 132 and the object 120 of interest. A method of triangulation can be used to ascertain the object distance Z using a binocular disparity d between the two images 199A and 199B. Specifically, coordinates $(X_i, Y_i, Z_i)$ of a pixel i in the image 199A (left) can be given as follows:

$$X_i = \frac{T}{d}(x_i^l - c_x), \qquad \text{(Equation 1)}$$

$$Y_i = \frac{T}{d}(y_i^l - c_y), \qquad \text{(Equation 2)}$$

$$Z_i = \frac{T}{d}f \qquad \text{(Equation 3)}$$

where $c_x$ and $c_y$ represent respective center coordinates of the imaging devices 131, 132, $x_i$ and $y_i$ represent the coordinates of the object 120 of interest in one or both of the images 199A (left) and 199B (right), T is the baseline (in other words, the distance between the center coordinates of the imaging devices 131, 132), and f is a rectified focal length of the imaging devices 131, 132, i is an index over multiple objects 120 of interest and/or over multiple selected points of an object 120 of interest that can be used to determine the object distance Z, and d is the binocular disparity between the images 199A(l) and 199B(r), represented here as:

$$d_i = x_i^l - x_i^r \qquad \text{(Equation 4)}$$

The focal length adjustment apparatus 110 can include any processing hardware and/or software needed to perform image acquisition, focal length adjustment, calibration, and any other functions and operations described herein. Without limitation, the focal length adjustment apparatus 110 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In certain embodiments, the focal length adjustment apparatus 110 can include an image processing engine or media processing unit, which can include specialized hardware for enhancing the speed and efficiency of image capture, filtering, and processing operations. Such operations include, for example, Bayer transformations, demosaicing operations, noise reduction operations, and/or image sharpening/softening operations.

In certain embodiments, the focal length adjustment apparatus 110 can include specialized hardware and/or software for performing focal length adjustment and parameter calibration. For example, specialized hardware and/or software can be provided for functions including, but are not limited to, reconstructing a three-dimensional depiction of the object 120 of interest using the two-dimensional images via stereopsis, determining whether a focal length adjustment is needed based on a distance between the imaging mechanism 130 and the object 120 of interest, determining an optimal focal length, conveying control signals to any components of the focal length adjustment apparatus 110 for focal length adjustment.

In some embodiments, the focal length adjustment apparatus 110 can include one or more additional hardware components (not shown), as desired. Exemplary additional hardware components include, but are not limited to, memories (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). Without limitation, one or more input/output devices (for example, buttons, a keyboard, keypad, trackball, displays, and a monitor) can also be included in the focal length adjustment apparatus 100, as desired.

In some embodiments, the image acquisition, focal length adjustment, calibration, and any other functions and operations described herein for the focal length adjustment apparatus 110 can be achieved by software running on a conventional processor or a general purpose computer, such as a personal computer. The software can be operated with suitable hardware discussed above as desired. The software, for example, can take any form of source code, object code, executable code and machine readable code. The source code can be written in any form of high-level programming languages, including but not limited to, C++, Java, Pascal, Visual B and the like.

Figure 7:
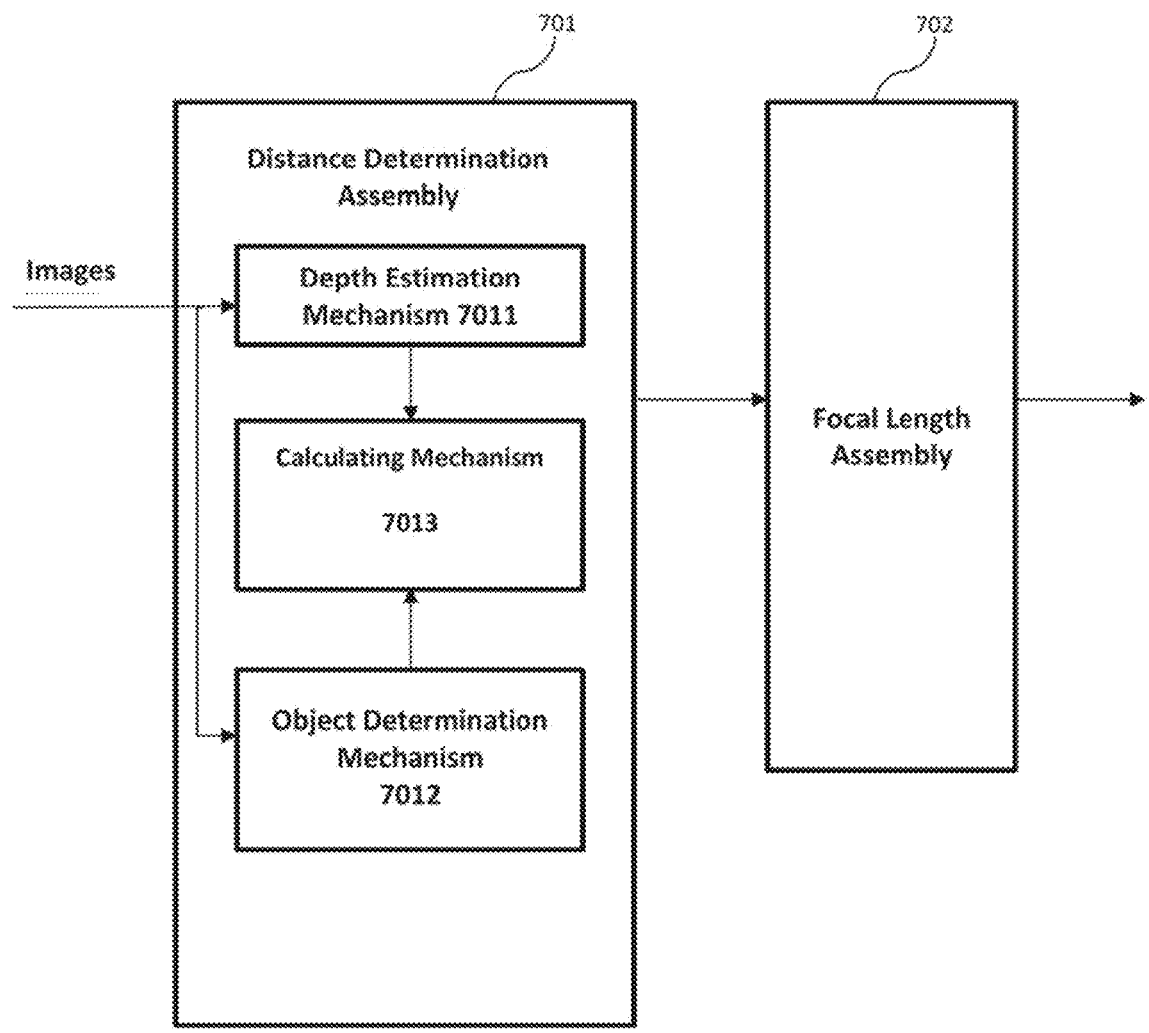
FIG. 7 is an exemplary top-level block diagram illustrating an embodiment of a system for adjusting focal length, wherein the system includes a distance assembly.

Turning now to FIG. 7, an exemplary block diagram illustrating an alternative embodiment of the focal length adjustment apparatus 110 of FIG. 1 is shown. The focal length adjustment apparatus 110 of FIG. 7 comprises a distance assembly 701 for determining the object distance Z, that is, a distance between the object 120 of interest in the scene 100 and the imaging mechanism 130. The focal length adjustment apparatus 110 further includes a focal length assembly 702 configured to automatically adjust the focal length of the imaging mechanism 130 according to the determined distance by the distance assembly 701.

As seen from FIG. 7, the distance assembly 701 is shown as comprising a depth estimation mechanism 7011 for obtaining a depth map of the scene 100, an object determination mechanism 7012 for determining the object 120 of interest in the scene 100 and a calculating mechanism 7013 for calculating distance of the object 120 of interest according to the depth map of the scene 100 from depth estimation mechanism 7011.

In an embodiment of the present disclosure, the depth estimation mechanism 7011 receives a first image 199A (shown in FIG. 2) of the scene 100 from the first imaging device 131 and a second image 199B (shown in FIG. 3) of the scene 100 from the second imaging device 132. Based on the first image 199A and the second image 199B of the scene 100 as shown in FIGS. 2 and 3, the depth estimation mechanism 7011 obtains their disparity, based on which a depth map 800 (shown in FIG. 8) is acquired. The specific operation of the depth estimation mechanism 7011 for obtaining the depth map will be described in detail below with reference to FIG. 8.

Figure 8:
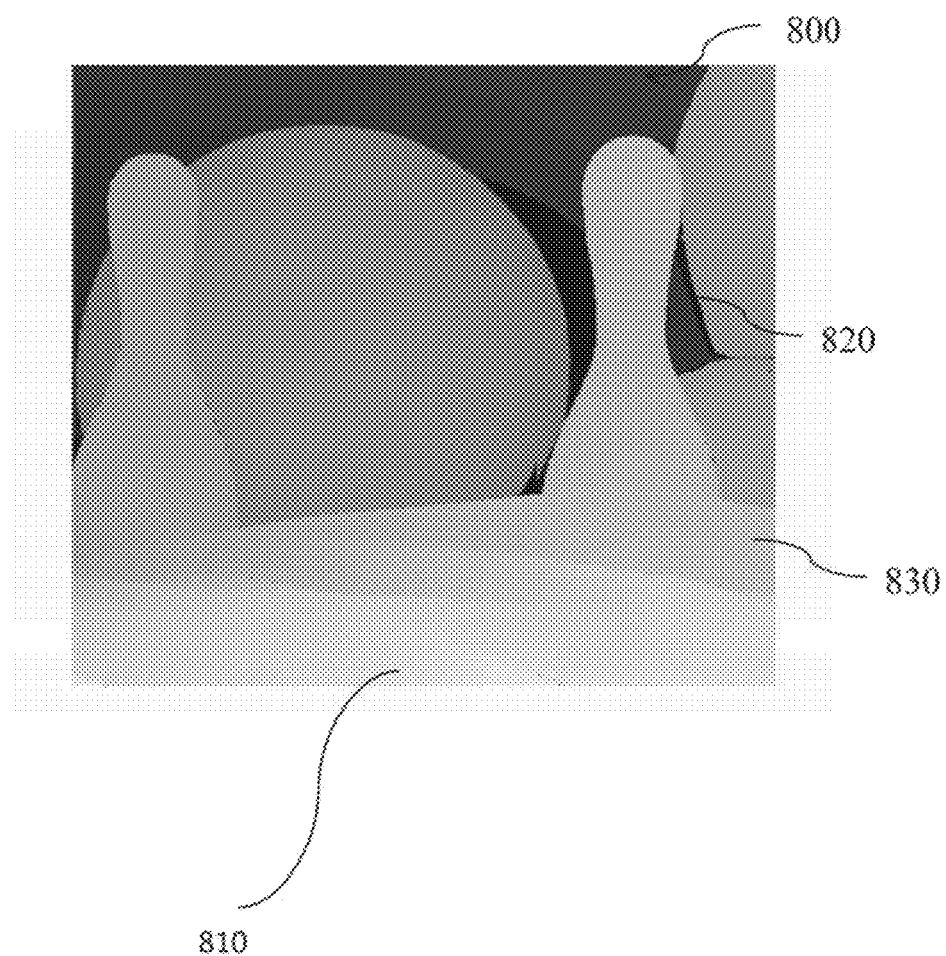
FIG. 8 is an exemplary depth map obtained by the focal length adjustment apparatus of FIG. 1.

An exemplary depth map 800 is depicted in FIG. 8. Each pixel (not shown) in the depth map 800 is associated with a value that represents a distance between the point corresponding to the pixel in the scene 100 (shown in FIG. 1) and the imaging mechanism 130 (shown in FIG. 1). For example, in certain embodiments, a brightness value is utilized to represent a distance between a point in the scene (either on the object 120 of interest or not on the object 120 of interest) and an imaging device which images the scene. Alternatively and/or additionally, different color values can be assigned to pixels to represent the distance. In a brightness value example, as seen from FIG. 8, a brighter area 810 indicates points in the scene 100 with nearer distances to the imaging mechanism 130 (shown in FIG. 1), a darker area 820 indicates points in the scene 100 with further distances to the imaging mechanism 130, and a grey area 830 indicates points in the scene 100 with distances between the near and far distance. If the object 120 of interest moves in the scene 100, a brightness of the pixels for the object 120 of interest can vary based upon the distance between the object 120 of interest and the imaging mechanism 130. The selected pixels for the object 120 of interest can become brighter when the distance between the object 120 of interest and the imaging mechanism 130 decreases and can become dimmer when the distance increases as shown in FIG. 8.

Returning to FIG. 7, the object determination mechanism 7012 can receive outside instructions to determine the object 120 (shown in FIG. 1) of interest by identifying the object 120 of interest selected in either of the first and the second images of the scene 100 (shown in FIG. 1). Outside instructions can be given by, for example, operators of the focal length adjustment apparatus 110. The selection of the object 120 of interest can be done by framing in the object 120 of interest in either of the first and the second images of the scene 100. The first and the second images of the scene 100 can be displayed on a display screen (not shown) and/or on a display screen (not shown) to the operator of the focal length adjustment apparatus 110 for selection. Alternatively or additionally, the selection of the object 120 of interest can be performed by clicking the display screen(s) on the object 120 of interest in either of the first and the second images of the scene 100 displayed on the display screen(s). The object determination mechanism 7012 can sense the framing and/or the clicking operation to identify the object 120 of interest being selected.

In another embodiment, the object determination mechanism 7012 enables to receive outside oral instructions from, for example, an operator of the focal length adjustment apparatus 110. Optionally, the oral instructions can be a pre-set name of the object 120 of interest.

Alternatively and/or additionally, the object determination mechanism 7012 can be enabled to automatically determine the object 120 of interest based on a judgment under at least a pre-set rule. Any rule for the judgment can be set as desired. For example, the pre-set rule may comprise that the object 120 of interest is determined if the object 120 of interest is approaching the first and the second imaging devices 131, 132 and/or if the object 120 of interest is within a certain distance from the first and the second imaging devices 131, 132.

Based on the depth map from the depth estimation mechanism 7011 and the information about the object 120 of interest from the object determination mechanism 7012, the calculating mechanism 7013 can be enabled to calculate the distance between the imaging mechanism 130 and the object 120 of interest. In some embodiments, the calculating mechanism 7013 calculates the distance in real time.

Based on the calculated distance, the focal length assembly 702 can be enabled to automatically adjust the focal length of the imaging mechanism 130, for example, in real time, with a tracking learning detection method based on gray level information of the object 120 of interest serving as initial values.

If a user wants to focus the imaging mechanism 130 on a particular object, for example, the object determination mechanism 7012 can enable the user to draw a frame on the display showing the images of the scene 100 to frame in the object 120 of interest to be tracked. The frame can be in any suitable dimension, size or shape, including, but not limited to, a shape of a rectangular, a square or a circle or even an irregular shape. Optionally, the user can be enabled to click the display screen(s) to confirm the selection. By using the depth map 800 (shown in FIG. 8) obtained by the depth estimation mechanism 7011, the calculating mechanism 7013 can be enabled to calculate the distance of the object being selected by the user and the focal length assembly 702 enables to adjust the focal length of the focal length adjustment apparatus 110 automatically according to the object distance Z (shown in FIG. 6). In some embodiments, the object distance Z is acquired in real time.

Figure 9:
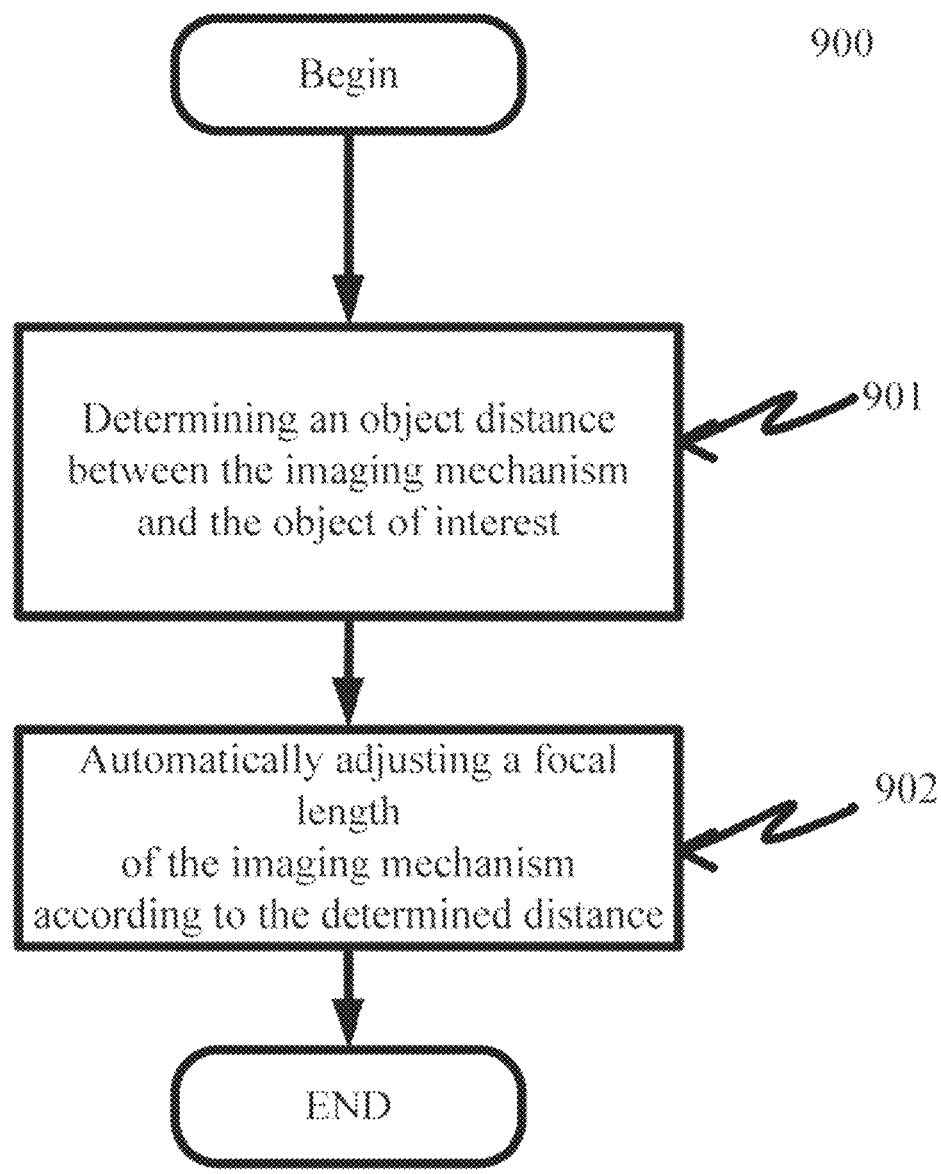
FIG. 9 is an exemplary top-level flow chart illustrating an embodiment of a method for focal length adjustment.

Referring now to FIG. 9, one embodiment of a method 900 for focal length adjustment is illustrated. At 901, an object distance between the imaging mechanism 130 (shown in FIG. 1) and the object 120 (shown in FIG. 1) of interest is determined. The object distance Z (shown in FIG. 6) can be determined by using any of several various methods, as desired. In some embodiments, the object distance Z can be determined by using a plurality of imaging devices 133 (shown in FIG. 1) in the imaging mechanism 130 via stereopsis. For example, two imaging devices 131, 132 (shown in FIG. 1) of the imaging mechanism 130 each can acquire an image (shown in FIGS. 2 and 3) of the object 120 of interest, and overlapping portions of the acquired images can be analyzed to assess the depth of the object 120 of interest. Alternatively and/or additionally, the object distance can be acquired using one or more non-stereopsis methods, such as by using a laser and/or using ultrasound. At 902, the focal length of the imaging mechanism 130 is automatically adjusted according to the object distance Z determined in step 901.

Figure 10:
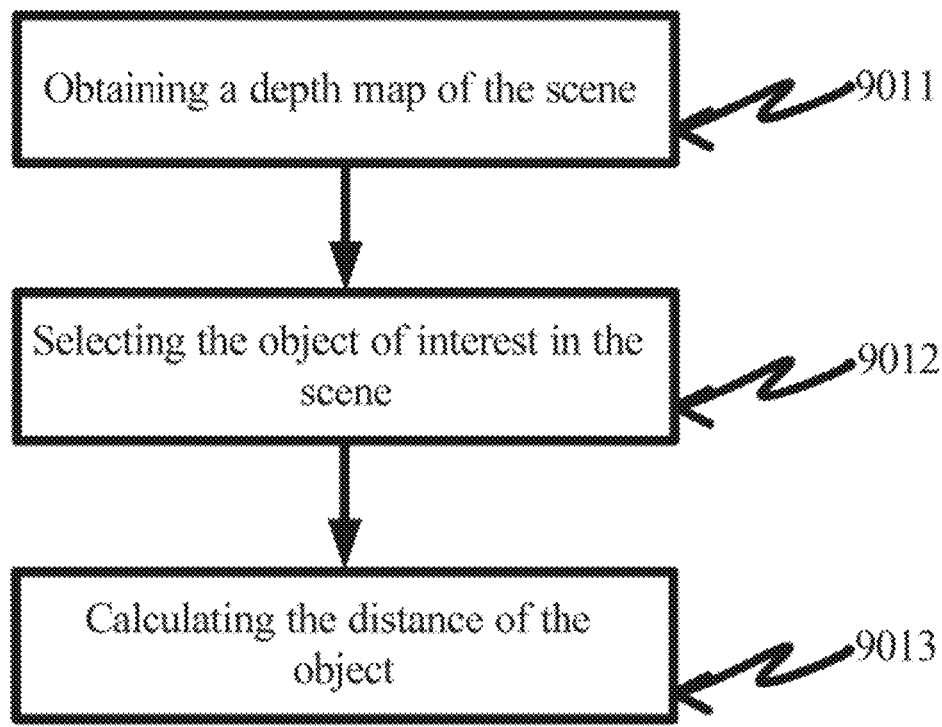
FIG. 10 is an exemplary flow chart illustrating a process of determining the distance between the imaging mechanism and the object of interest.

A detailed process 901 of determining the distance between the imaging mechanism 130 and the object 120 of interest is illustrated in FIG. 10. At 9011, a depth map of the scene 100 is obtained. Any process of obtaining a depth map may be applied here without limitation. An exemplary process is illustrated in details below.

In an embodiment, a depth map is obtained by calculating a disparity of scene images from the first and second imaging devices 131, 132. In the field of obtaining a depth map, an energy function is usually computed over a subset of the whole image. In one embodiment, a global energy function is optimized to obtain a disparity global energy. Specifically, the disparity global energy can be calculated by summing a disparity energy function and a scaled smoothing term.

An exemplary optimizing can be illustrated by the following equation:

$$E(d)=E_d(d)+pE_s(S) \quad \text{(Equation 5)}$$

wherein d indicates the disparity between the first and the second images of the scene, $E_d(d)$ is a data term, which indicates the disparity energy function and $E_s(d)$ indicates a smoothing term.

The data term $E_d(d)$ comprises a Birchfield-Tomasi data term which can be obtained in accordance with the equation:

$$E_d(d) = \sum_{x,y} E_{d_{BT-SAD}}(x, y, d(x, y) = d) \quad \text{(Equation 6)}$$

wherein, $$E_{d_{BT}}(x, y, d(x, y) = d) = \min\{C_1, C_2\} \quad \text{(Equation 7)}$$

$$C_1 = \min_{x-d-0.5 \leq x' \leq x-d+0.5} |I_L(x) - I_R(x')| \quad \text{(Equation 8)}$$

$$C_2 = \min_{x-0.5 \leq x' \leq x+0.5} |I_L(x') - I_R(x-d)| \quad \text{(Equation 9)}$$

$$E_{d_{BT-SAD}}(x, y, d(x, y) = d) = \sum \min\{C_1, C_2\} \quad \text{(Equation 10)}$$

wherein, $I_L$ represents the first image of the scene 100 captured by the first imaging device 131 and $I_R$ represents the second image of the scene 100 captured by the second imaging device 132 respectively; x in $I_L(x)$ represents a horizontal coordinate of a pixel in the first image and x' in $I_R(x')$ represents a horizontal coordinate of the pixel in the second image; (x, y) represents coordinates of a pixel in the scene 100.

The introducing of the Birchfield-Tomasi data term which is a data term often used in image sampling/matching resolves a problem of incorrect image matching by utilizing a matching precision of sub pixels, which is a pixel dissimilarity measure that is insensitive to image sampling. The contents of IEEE Transactions on Pattern Analysis and Machine Intelligence (1998) explaining the Birchfield-Tomasi data term is incorporated here by reference. Other data terms may be adopted as the data term in Equation 5 when calculating the disparity global energy.

The smoothing term $E_s(d)$ can be presented by an energy function of differential of disparity, which can be obtained by, for all neighbors of a pixel with the coordination of (x,y), summing scaled trigger functions of a disparity between two neighboring pixels. Specifically, the smoothing term $E_s(d)$ can be obtained in accordance with the equation as follows:

$$E_s(\Delta d) = \Sigma p_1 T(|d(x,y)-d(x',y')|==1) + p_2 T(|d(x,y)-d(x',y')| > 1) \quad \text{(Equation 11)}$$

wherein, (x, y) represents the coordinates of the pixel of the first image and (x', y') represents the coordinates of the pixel of the second image; $p_2$ and $p_1$ are two adjustable weights, and usually $p_2 \geq p_1$ and the summation sign is for all neighbors of (x,y) in which four domains are usually used, T is a trigger function which is triggered when the conditions in the parentheses are true.

In order to optimize the smoothing term $E_s(d)$, a fastest dynamic planning is utilized by aggregating data terms in a plurality of directions to obtain a directional energy function for each of the directions and accumulating the directional energy functions in the directions to obtain the energy function. In an embodiment, four or eight directions are selected to aggregate data terms. Other numbers of directions, such as three, five or ten directions, can be selected without limitation.

In an embodiment, an energy function in one direction can be obtained by summing its corresponding smoothing term and the dynamic planning in this direction. A dynamic planning in one direction can be presented by a recurrence based on the energy functions of its neighbors in this direction. For example, energy functions of one pixel's neighbors in the horizontal direction are presented as L(x−1, y, d), L(x−1, y, d+1), L(x−1, y, d−1) and L(x−1, y, d'). Specifically, an energy function in horizontal direction is obtained in accordance with the equation:

$$L(x, y, d) = E_s(x, y, d) +$$
$$\min\{L(x-1, y, d), L(x-1, y, d-1) +$$
$$p_1, L(x-1, y, d+1) +$$
$$p_1, \min_{d'} L(p-1, y, d')\} + p_2\} - \min_{d'} L(x-1, y, d') \quad \text{(Equation 12)}$$

wherein, the energy received at the coordinates (x, y, d) is defined as L(x, y, d), which is presented as a recurrence based on the energy of neighbors L(x−1, y, d), L(x−1, y, d+1), L(x−1, y, d−1) and L(x−1, y, d').

Furthermore, a best depth is obtained by seeking the disparity value that minimizes the summation of energy in a plurality of directions. In an embodiment, the best depth is obtained in accordance with the equation:

$$d^* = \text{argmin}_d \Sigma L(x, y, d) \quad \text{(Equation 13)}$$

wherein, d* indicates the best depth, L(x, y, d) indicates an energy function in one direction.

As an embodiment, some noise is reduced by matching the first and second scene images and/or identifying respective unique features of the first and second scene images while setting the disparity as −1.

The present disclosure also optimizes the depth map obtained by the depth estimation mechanism 7011. As described above, the global energy function is optimized by compensating errors of the depth estimation mechanism 7011. Specifically, the errors can be compensated by following equations:

$$\frac{b}{c_1} = \frac{f}{f+D} => c_1 = \frac{b(f+D)}{f} \quad \text{(Equation 14)}$$

$$\frac{c_1}{a} = \frac{x}{x+D+f} => x = \frac{c_1(D+f)}{a-c_1} \quad \text{(Equation 15)}$$

by combining Equations 14 and 15, we get:

$$+x = \frac{b(f+D)^2}{af - b(f+D)} \approx \frac{D^2}{a*\frac{f}{b} - D} \quad \text{(Equation 16)}$$

on the other hand, we have:

$$\frac{b}{c_2} = \frac{f}{f+D-x} => c_2 = \frac{b(f+D-x)}{f} \quad \text{(Equation 17)}$$

$$\frac{c_2}{a} = \frac{x}{D+f} => x = \frac{c_2(D+f)}{a} \quad \text{(Equation 18)}$$

by combining Equations 17 and 18, we get:

$$-x = \frac{b(f+D)^2}{af + b(f+D)} \approx \frac{D^2}{a*\frac{f}{b} + D} \quad \text{(Equation 19)}$$

wherein
  f=focal length (mm)
  D=depth (depth between the object and the imaging plane, mm)
  a=baseline (the distance between the central lines of the two imaging devices, mm)
  b=actual distance of two adjacent pixels (mm)
  d=disparity (measured in pixel)

Therefore, the depth estimation errors are within a range of [−x, x], and the estimated depth is in a range of [D−x, D+x]. The above error analysis and the compensation are based on following assumptions. For example, the error estimation is based on an assumption that camera calibration parameters are completely correct and an average error of the disparity map is a theoretical value for 1 pixel. An actual calibration can introduce errors, and a depth estimation error may exceed 1 pixel. Therefore, the above data of errors reflects a trend only. As a reference: an average error of a depth estimation in four testing maps by using the first ranked stereo matching process, Middelbury, is 1.29+0.14+6.47+5.70/4=3.4 (pixel). Even under a situation with no noise, no alteration of light beams and calibration parameters are correct, and the current best process presents an average error for all points as 3.4 pixels.

Figure 11:
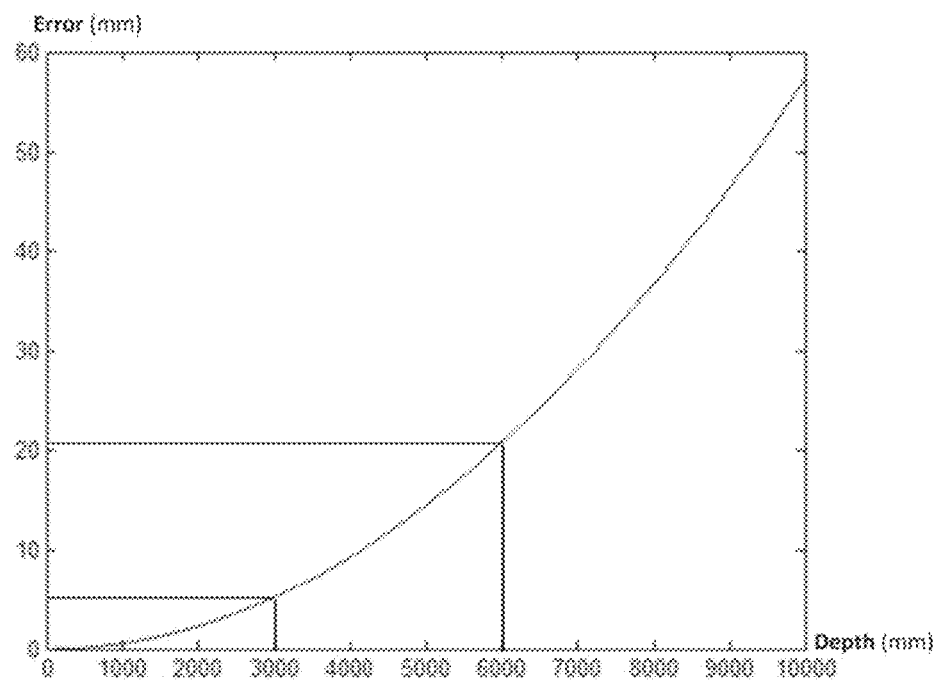
FIGS. 11-13 are exemplary schematic charts for showing errors of the focal length adjustment apparatus of FIG. 1 and the compensation effect for the errors.
Figure 12:
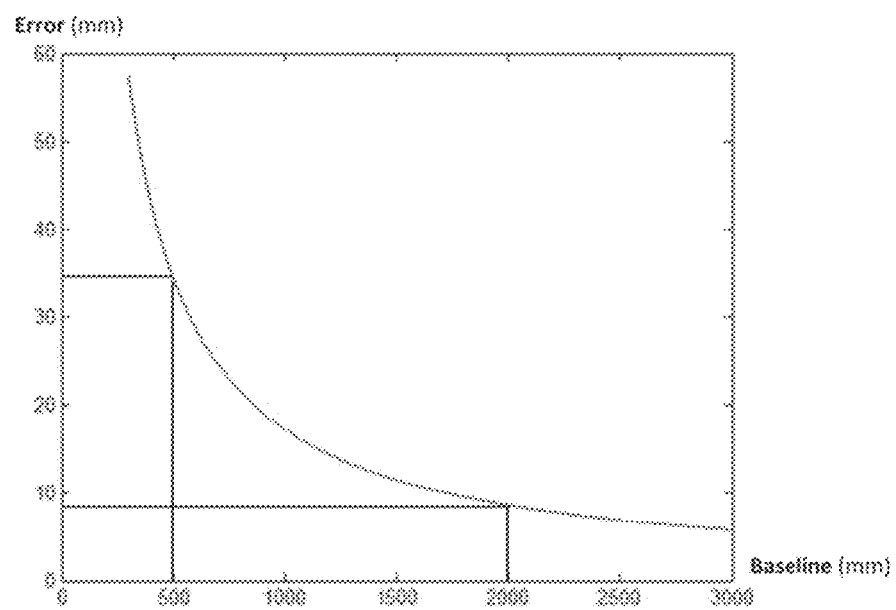
Figure 13:
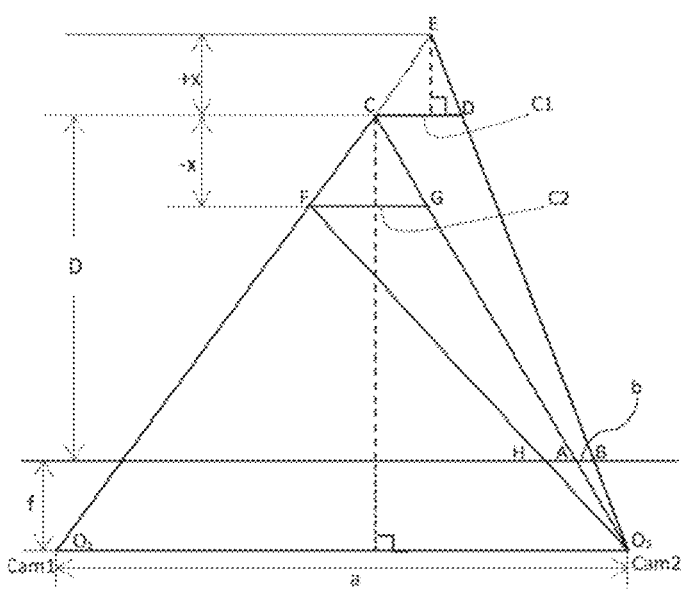

A few schematic charts showing the errors of the focal length adjustment apparatus 110 and the compensation effect for the errors are depicted in FIGS. 11-13.

FIG. 11 illustrates an exemplary relationship between the estimated error of the focal length adjustment apparatus 100 and the measured depth D of the scene 100 when only the measured depth D varies. In other words, the baseline a, the distance of two adjacent pixels b and the focal length f of the equations 16, 17 remain constant as the measured depth D changes. As shown in FIG. 11, a horizontal axis represents a measured depth D in mm, and a vertical axis represents the estimated error of the focal length adjustment apparatus 110. As FIG. 11 shows, when the measured depth D changes, the estimated error of the focal length adjustment apparatus 100 also changes in a non-linear relationship with reference to the measured depth D. For example, when the measured depth D is 3000 mm, the estimated error according to FIG. 11 is about 5 mm, but when the measured depth D increases to 6000 mm, the corresponding estimated error increases to over 20 mm.

Although shown and described as being the non-linear relationship in FIG. 11 for exemplary purposes only, the relationship of the estimated error and the measured depth D can be any linear and/or non-linear relationships.

FIG. 12 illustrates an exemplary relationship between the estimated error of the focal length adjustment apparatus 100 and the baseline when only the baseline a varies. Here, the measured depth D, the distance of two adjacent pixels b and the focal length f of the equations 16, 17 remain constant when the baseline a changes. In FIG. 12, a horizontal axis represents the baseline a in mm, and a vertical axis represents the estimated error in mm. As FIG. 12 shows, when the baseline a increases, the estimated error can decrease by in accordance with a non-linear relationship between the estimated error and the baseline a. For example, when the baseline a is 500 mm, the estimated error according to FIG. 12 can be as high as 35 mm, but when the baseline a increases to 2000 mm, the estimated error decreases to about 8 mm.

Although shown and described as being the non-linear relationship in FIG. 12 for exemplary purposes only, the relationship of the estimated error and the baseline can be any linear and/or non-linear relationships.

FIG. 13 is an illustrative example for showing representative corresponding relationships among the image representation symbols and the variables contained in the Equations 14-19. In other words, Equations 14-19 can be deducted from the represented relationships illustrated in FIG. 13. Here, the imaging devices 131, 132 (shown in FIG. 1) are represented with two cameras, Cam1 and Cam2, which have a baseline "a" and a focus length "f".

As shown in FIG. 13, triangles $ABO_2$ and $CBO_2$ are similar because AB is parallel to CD. Therefore, we can get Equation 14:

$$\frac{b}{c_1} = \frac{f}{f+D} => c_1 = \frac{b(f+D)}{f}.$$

In addition, triangles ADE and $O_1O_2E$ are similar because CD is parallel to $O_1O_2$. Therefore, we can get Equation 15:

$$\frac{c_1}{a} = \frac{x}{x+D+f} => x = \frac{c_1(D+f)}{a-c_1}.$$

By combining Equations 14 and 15, we can reach Equation 16:

$$+x = \frac{b(f+D)^2}{af - b(f+D)} \approx \frac{D^2}{a*\frac{f}{b} - D}.$$

For same reasons, Equation 19 can be deducted from a combination of a similarity relationship of triangles $AHO_2$ and a similarity relationship of $FGO_2$ and $O_1O_2C$. In both Equations 16 and 19, D is the actual depth between the scene 100 and the imaging plane, a is the baseline between the two image devices 131, 132, b is the distance of two adjacent pixels and f is the focal length of the imaging devises 131, 132, as shown in FIG. 13.

Although shown and described as being the same absolute value for −x and +x in FIG. 13 for exemplary purposes only, the estimated errors −x and +x can be different absolute values as results of equations 16 and 19, in which case, b can carry different values in each equation.

Based on the characteristics of the estimated errors shown in FIGS. 11 and 12, the depth map can be further optimized by applying a non-partial optimizing equation whose Jacobi iteration can be obtained by a recurrence filtering. Specifically, the non-partial optimizing equation is defined in accordance with the following equation:

$E(d)=\Sigma|d(x,y)-d*(x,y)|^2+\Sigma \exp(|I_L(x,y)-I_L(x',y')|+|x'-x|+|y'-y|)|d(x,y)-d(x',y')|$ (Equation 20)

in which, d*(x, y) indicates the optimal depth map and d(x,y) is the estimated depth map; I(x,y) represents the intensity of the image; x,y are the coordinates of the pixel in an image coordinate; x',y' are the coordinates of an adjacent pixel of x,y in the same image.

Similarly to the operations performed by the object determination mechanism 7012 and the calculating mechanism 7013, in step 9012 of FIG. 10, the object 120 of interest is determined and the distance between the object 120 of interest and the imaging mechanism 130 is calculated in step 9013 of FIG. 10, which in turn serves as a basis for automatically adjusting the focal length of the imaging mechanism 130.

A stereoscopic imaging system configured to conduct the aforementioned operations to perform automatic focal length adjustment can be obtained according to any embodiment of the present disclosure.

Furthermore, a computer program product comprising instructions for automatically adjusting focal length of a stereoscopic imaging system having at least two imaging devices in accordance with the aforementioned operations can be obtained according to an embodiment of the present disclosure. In some embodiments, the method for automatically adjusting focal length according to the present disclosure can be achieved by an ordinary computing device, such as a personal computer and/or a microcomputer.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for focal length adjustment, comprising:
    capturing images of a scene using a first imaging device and a second imaging device of an imaging mechanism;
    determining a distance between an object of interest in the scene and the imaging mechanism based on the images of the scene;
    aggregating data items in a plurality of directions to obtain a directional energy function for each of the directions, including obtaining the directional energy function in one of the directions by summing a corresponding smoothing item and a dynamic planning in the one of the directions; and
    accumulating the directional energy functions in the directions to obtain an energy function; and
    automatically adjusting a focal length of the imaging mechanism according to the distance.

2. The method of claim 1, wherein determining the distance further comprises:
    obtaining a depth map of the scene from the images;
    selecting the object of interest in the scene; and
    calculating the distance of the object of interest according to the depth map of the scene.

3. The method of claim 2, wherein obtaining the depth map includes calculating a disparity of the images.

4. The method of claim 3, wherein calculating the disparity includes optimizing a global energy function.

5. The method of claim 4, wherein optimizing the global energy function includes summing a disparity energy function and a scaled smoothing term.

6. The method of claim 5, wherein optimizing the global energy function further includes obtaining the disparity energy function by accumulating a minimum disparity of coordinates for pixels in the images.

7. The method of claim 5, wherein optimizing the global energy function further includes, for all neighbors of a pixel, accumulating scaled trigger functions of a disparity between two neighboring pixels to obtain the scaled smoothing term.

8. The method of claim 2, further comprising optimizing the depth map by using a non-partial optimizing equation.

9. The method of claim 8, further comprising obtaining a Jacobi iteration of the non-partial optimizing equation by using a recurrence filtering.

10. The method of claim 2, wherein selecting the object of interest in the scene includes receiving outside instructions to select the object of interest.

11. The method of claim 10, wherein receiving the outside instructions includes identifying the object of interest selected on either of the images.

12. The method of claim 1, wherein aggregating the data items further includes obtaining the directional energy functions in a predetermined number of directions.

13. The method of claim 1, wherein summing the corresponding smoothing item and the dynamic planning includes presenting the dynamic planning of a pixel in the one of the directions with a recurrence based on the directional energy functions of neighbors of the pixel in the one of the directions.

14. The method of claim 13, wherein aggregating the data items includes calculating an energy by the recurrence based on the directional energy functions of the neighbors of the pixel in a horizontal direction.

15. The method of claim 1, further comprising reducing noise by performing at least one of matching the images or identifying respective unique features of the images.

16. The method of claim 1, further comprising compensating an error based on factors at least selected from a group consisting of baseline lines of the first imaging device and the second imaging device, an actual distance of two adjacent pixels, the focal lengths of the first imaging device and the second imaging device, and the depth between the object of interest and the first imaging device and the second imaging device.

17. A focal length adjustment apparatus, comprising:
   an imaging mechanism including a first imaging device and a second imaging device configured to capture images of a scene;
   a distance assembly configured to determine a distance between an object of interest in the scene and the imaging mechanism based on the images of the scene, the distance assembly including a depth estimation mechanism configured to:
      aggregate data items in a plurality of directions to obtain a directional energy function for each of the directions, including obtaining the directional energy function in one of the directions by summing a corresponding smoothing item and a dynamic planning in the one of the directions; and
      accumulate the directional energy functions in the directions to obtain an energy function; and
   a focal length adjusting assembly configured to automatically adjust a focal length of the imaging mechanism according to the distance.

18. A non-transitory computer-readable storage medium storing program codes that, when executed by a computer, cause the computer to:
   determine a distance between an object of interest in a scene and an imaging mechanism including a first imaging device and a second imaging device based on images of the scene captured by the first imaging device and the second imaging device;
   aggregate data items in a plurality of directions to obtain a directional energy function for each of the directions, including obtaining the directional energy function in one of the directions by summing a corresponding smoothing item and a dynamic planning in the one of the directions; and
   accumulate the directional energy functions in the directions to obtain an energy function; and
   generate an instruction to automatically adjust a focal length of the imaging mechanism according to the distance.

19. A method for focal length adjustment, comprising:
   capturing images of a scene using a first imaging device and a second imaging device of an imaging mechanism;
   selecting an object of interest in the scene;
   obtaining an estimated depth map of the scene from the images;
   optimizing the estimated depth map using non-partial optimization and iteration, by minimizing energy functions based on intensities of the images, to obtain an optimized depth map;
   calculating a distance between the object of interest in the scene and the imaging mechanism according to the optimized depth map; and
   automatically adjusting a focal length of the imaging mechanism according to the distance.

* * * * *